United States Patent
Myrex et al.

(10) Patent No.: US 10,807,571 B1
(45) Date of Patent: Oct. 20, 2020

(54) ADJUSTABLE MOTOR MOUNT FOR SEMI-TRAILER LANDING GEAR

(71) Applicants: Kelvin Lee Myrex, Bremen, AL (US); Russell Van Freeman, Bremen, AL (US)

(72) Inventors: Kelvin Lee Myrex, Bremen, AL (US); Russell Van Freeman, Bremen, AL (US)

( * ) Notice: Subject to any disclaimer, the term of this patent is extended or adjusted under 35 U.S.C. 154(b) by 0 days.

(21) Appl. No.: 16/728,708

(22) Filed: Dec. 27, 2019

Related U.S. Application Data

(63) Continuation-in-part of application No. 15/346,628, filed on Nov. 8, 2016, now Pat. No. 10,589,727.

(60) Provisional application No. 62/285,765, filed on Nov. 9, 2015.

(51) Int. Cl.
*B60S 9/04* (2006.01)
*B60S 9/06* (2006.01)
*B60S 9/22* (2006.01)

(52) U.S. Cl.
CPC . *B60S 9/04* (2013.01); *B60S 9/06* (2013.01); *B60S 9/22* (2013.01)

(58) Field of Classification Search
CPC ...... B60S 9/02; B60S 9/04; B60S 9/06; B60S 9/08; B60S 9/18; B60S 9/00; B60S 9/205; B60S 9/21; B60S 9/22
See application file for complete search history.

(56) References Cited

U.S. PATENT DOCUMENTS

| 3,415,490 | A | * | 12/1968 | Steele | B66F 13/00 254/45 |
| 3,658,359 | A | * | 4/1972 | Claflin | B60S 9/08 254/419 |
| 3,807,756 | A | * | 4/1974 | Glassmeyer | B62D 53/0857 280/766.1 |
| 3,976,310 | A | * | 8/1976 | Carr | B60D 1/66 280/766.1 |
| 4,345,779 | A | * | 8/1982 | Busby | B60S 9/20 280/766.1 |
| 4,402,526 | A | * | 9/1983 | Huetsch | B60S 9/08 280/766.1 |
| 5,050,845 | A | * | 9/1991 | Aline | B60S 9/12 254/419 |
| 5,911,437 | A | * | 6/1999 | Lawrence | B60S 9/10 254/419 |

(Continued)

*Primary Examiner* — Jonathan Liu
*Assistant Examiner* — Guang H Guan
(74) *Attorney, Agent, or Firm* — Lanier Ford Shaver & Payne, PC; Gerald M. Walsh

(57) ABSTRACT

An adjustable motor mounting system having an adjustable motor mount and a gear box with a motor. The adjustable motor mount has a first plate attached slidably to I-beams on a frame of a semi-trailer and attached to a second plate with a hinge so that the second plate is rotatable relative to the first plate. A third plate is attached slidably to the second plate and has a mounting plate attached thereto. The gear box is attached to the mounting plate and to a landing gear crankshaft of the semi-trailer. The adjustable motor mounting system renders the gear box movable towards or away from the landing gear crankshaft, movable leftward or rightward of the landing gear crankshaft, and movable upward or downward relative to the landing gear crankshaft.

16 Claims, 8 Drawing Sheets

(56) References Cited

U.S. PATENT DOCUMENTS

| | | | | |
|---|---|---|---|---|
| 6,042,074 | A * | 3/2000 | Cusimano | B60S 9/08 |
| | | | | 248/354.1 |
| 6,086,099 | A * | 7/2000 | Kingsbury | B60S 9/08 |
| | | | | 254/419 |
| 8,052,125 | B2 * | 11/2011 | Garceau | B66F 3/44 |
| | | | | 254/418 |
| 9,677,307 | B2 * | 6/2017 | McCuistion | E05D 3/022 |
| 10,589,727 | B1 * | 3/2020 | Myrex | B60S 9/02 |
| 2002/0053794 | A1 * | 5/2002 | Fender | B60S 9/08 |
| | | | | 280/766.1 |
| 2004/0080125 | A1 * | 4/2004 | Bird | B60S 9/08 |
| | | | | 280/6.153 |
| 2006/0243872 | A1 * | 11/2006 | Benzi | F16M 11/10 |
| | | | | 248/282.1 |

\* cited by examiner

ADJUSTABLE MOTOR MOUNT FOR SEMI-TRAILER LANDING GEAR

CROSS-REFERENCE TO RELATED APPLICATIONS

This application claims priority of U.S. Provisional Application Ser. No. 62/285,765 filed on Nov. 9, 2015, and U.S. Nonprovisional application Ser. No. 15/346,628 filed on Nov. 8, 2016, the disclosures of which are incorporated herein by reference.

FIELD OF THE INVENTION

This invention relates to adjustable motor mounts and, particularly, to an adjustable motor mount for attaching a motor to the crank shaft of the landing gear of a semi-trailer.

BACKGROUND OF THE INVENTION

Many semi-trailers have a front landing gear for support of the front of the trailer when the tractor is detached. Such landing gears generally have two spaced-apart, telescoping or Jack-type landing gear legs and feet which extend downwardly from the floor of the trailer. Each leg is operatively attached to screw and follower or a rack and pinion gear arrangement which is driven by a landing gear drive shaft which extends between the legs and which causes extension or retraction of the legs and feet depending on the direction in which it is rotated.

Traditionally, a hand operable handle or crank is attached to the landing gear drive shaft by a pin or bolt which serves as a hinge connection allowing the handle to be pivoted out of the way while not in use. Manual rotation of the handle in one direction causes extension of the feet and lifting of the trailer to, for example, separate the trailer from a semi-tractor, and requires considerable time and effort on the part of the person manually rotating the hand crank. Manually operated jack structures, however, are often difficult to use, require much time for their operation and expose the operator to potential injuries as he is positioned next to the trailer while turning the crank to raise or lower the landing gear to in turn raise or lower the trailer.

A number of devices for mechanically or electrically extending and retracting the landing gear of a semi-trailer are known. These devices are, in general, cumbersome and expensive and generally require installation of such devices on the semi-trailer at the time of installation of the landing gear thereon. Owing primarily to the complexity and expense of the prior art systems, they have not enjoyed widespread acceptance in the trucking industry. Also, the complexity of such systems has rendered them relatively fragile and therefore generally unsuited to the rugged environment to which over-the-road semi-trailers are subjected daily.

What is needed is a simple, adjustable motor mount system for easy installation beneath the floor of a semi-trailer which will allow rapid and easy alignment and attachment of the drive shaft of the motor to the crank shaft of the landing gear of the semi-trailer.

SUMMARY OF THE INVENTION

The present invention is an adjustable motor mounting system having an adjustable motor mount and a gear box with a motor. The adjustable motor mount has a first plate and a second plate, each having a first end and a second end opposite the first end, a first side and a second side opposite the first side, and a top surface and a bottom surface. The adjustable motor mount also has a third plate having a first side and a second side opposite the first side, the first side of said third plate having a mounting plate attached thereto. A hinge connects the first end of the second plate to the first end of the first plate so that the second plate is rotatable relative to the first plate and the third plate is attached slidably to the second plate. The top surface of the first plate has I-beam mounts attached slidably to I-beams on a frame of a semi-trailer. A gear box with a motor is attached directly to the mounting plate on the first side of the third plate. The gear box is connected to a landing gear crankshaft of the semi-trailer.

The gear box and motor are movable towards or away from the landing gear crankshaft by moving the I-beam mounts along the I-beams towards or away from the landing gear crankshaft. The gear box and motor are movable to one side or the other of the landing gear crankshaft by moving the I-beam mounts toward the first end or the second end of the first plate and are movable towards or away from the landing gear crankshaft by moving the I-beam mounts towards the first side or the second side of the first plate. The gearbox and motor is rotatable upward around the hinge or downward around the hinge and is movable upward towards the first end of the second plate or downward towards the second end of the second plate. The gearbox has a first end, a second end opposite the first end, a first side, a second side opposite the first side, a front surface, and a rear surface, wherein the gearbox has a female connecting coupler that extends from the front surface of the gearbox to the rear surface of the gearbox. The female connecting coupler is connected to the landing gear crankshaft of the semi-trailer. The hinge may have spaced hinge members on the first plate and on the second plate with a hinge rod therethrough so that the second plate is slidable on the hinge rod towards the first side of the first plate and towards the second side of the first plate.

An advantage of the adjustable motor mount of the present invention is a motor mount that allows the motor to be easily moved upward, downward, left, right, towards, and away from the crank shaft of the landing gear drive mechanism.

Another advantage is an adjustable motor mount that is easy to install on the frame of a semi-trailer.

Another advantage is an adjustable motor mount that can fit any landing gear drive mechanism.

Another advantage is an adjustable motor mount that is rugged and durable.

DETAILED DESCRIPTION OF THE INVENTION

While the following disclosure details the preferred embodiments of the present invention, it is to be understood that the invention is not limited in its application to the details of arrangement of the parts illustrated in the accompanying figures and described in the disclosure, since the invention is capable of other embodiments and of being practiced in various ways.

Figure 1:
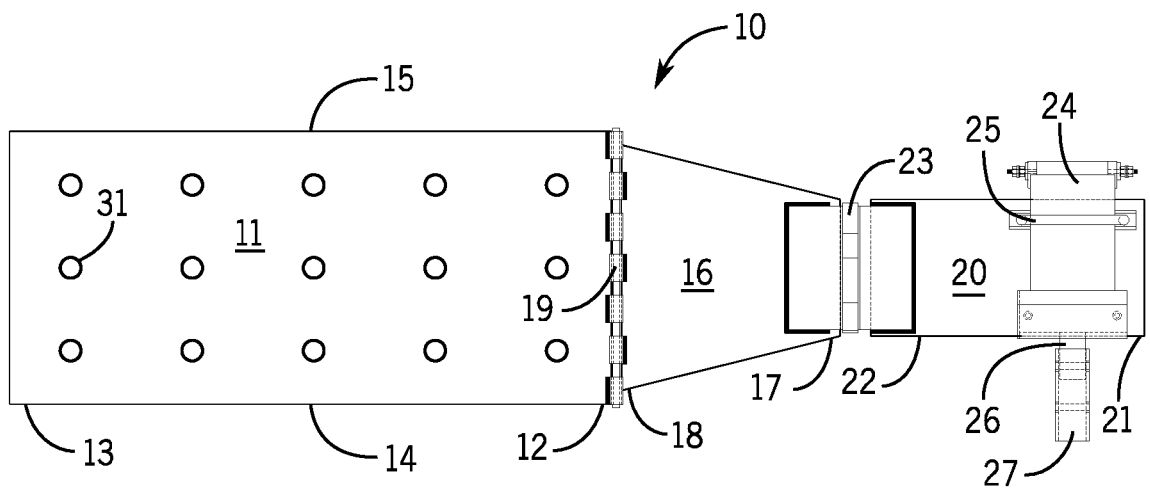
FIG. 1 illustrates a top plan view of the adjustable motor mount of the present invention.

FIG. 1 shows a top plan view of the adjustable motor mount 10 of the present invention. The motor mount has a first plate 11 having a first end 12, a second opposite end 13, a first side 14, and a second opposite side 15. The first plate 11 is designed for mounting to the frame of a semi-trailer, for example, to the floor joists. A second plate 16 has a first end 17 and a second opposite end 18. A hinge 19 connects the second plate 16 rotatably to the first plate 11. A third plate 20 has a first end 21 and a second opposite end 22. A hinge 23 connects the third plate 20 rotatably to the second plate 16. A motor 24 is shown attached to the third plate 20 near the first end 21 of the third plate 20. The motor 24 can be attached to the third plate 20 by any suitable method, for example, with a U-bolt 25. A drive shaft 26 of the motor 24 can have a connecting coupler 27 to reversibly connect the drive shaft 26 to the crank shaft 28 of a landing gear drive mechanism with a clip pin 37. (see FIG. 3).

Figure 2:
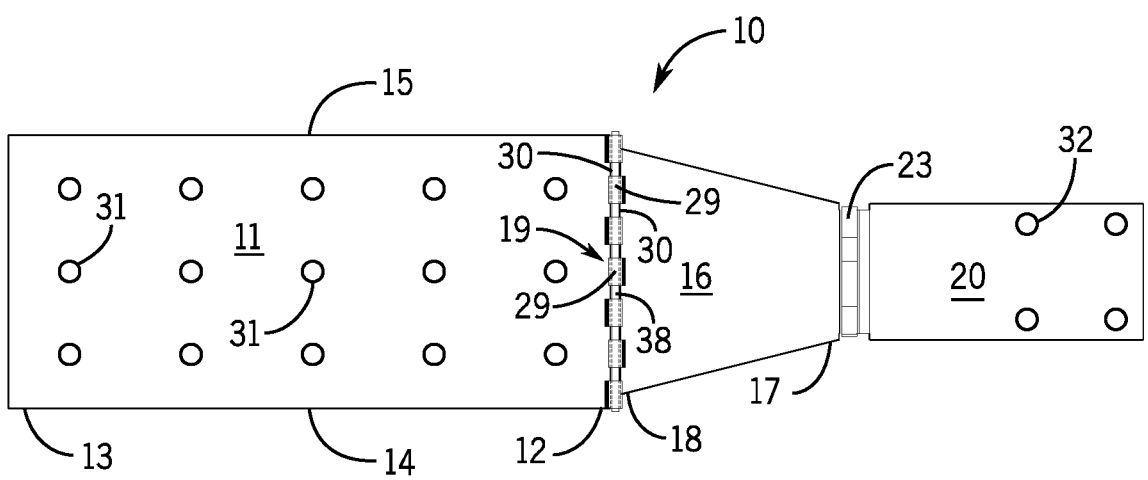
FIG. 2 illustrates a bottom perspective view of the adjustable motor mount.

FIG. 2 shows a bottom perspective view of the adjustable motor mount 10. FIG. 2 further shows that the first plate 11 and the second plate 16 have hinge members 29 with spaces 30 therebetween. The hinge members 29 on the second plate 16 can slide along the hinge pin 31 in the spaces 30. Thus, second plate 16 can be moved to slide towards the first side 14 or towards the second opposite side 15 of the first plate 11, resulting in the movement of the third plate 20 towards the first side 14 or towards the second opposite side 15 of the first plate 11. With this dual hinge mechanism, the third plate 20 can be moved above or below the plane of the first plate 11, toward or away from the first plate 11, and towards the first side 14 or the second opposite side 15 of the first plate 11. Holes 31 can be put in the first plate 11 for mounting the first plate 11 to the frame of a semi-trailer. Holes 32 can be put in the third plate 20 to attach the motor 24 to the third plate 20.

Figure 3:
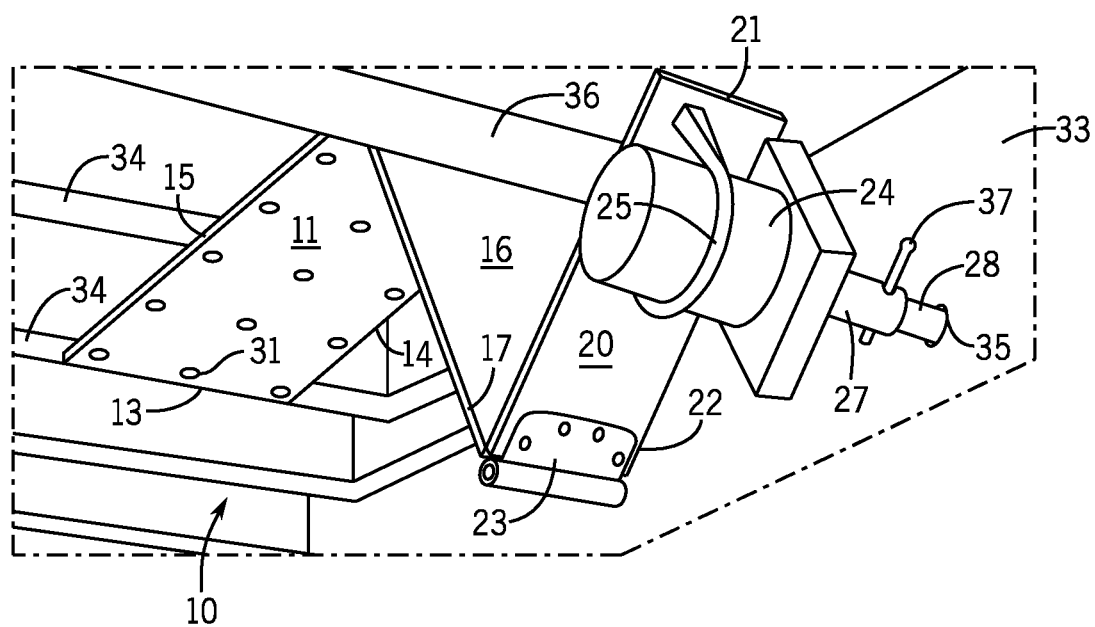
FIG. 3 shows a view of the adjustable motor mount attached to the frame of a semi-trailer, with a motor attached to the motor mount and with a drive shaft of the motor aligned with and attached to the drive shaft of a landing gear drive mechanism.

FIG. 3 shows the adjustable motor mount 10 placed under a semi-trailer 33. The first plate 11 is attached to floor joists 34 of the semi-trailer 33. A landing gear crankshaft 28 is shown extending under the semi-trailer 33 through an opening 35. The first plate 11 extends towards a landing gear drive shaft 36. The second plate 16 extends down below the landing gear drive shaft 36 and the third plate 20 extends upward. A motor 24 is attached to the third plate 20. The motor 24 can be moved up, down, left, right, towards, or away from the landing gear crankshaft 28 by means of the dual hinge mechanism of the adjustable motor mount 10. The connecting coupler 27 on the drive shaft 26 of the motor 24 can, thus, be easily aligned with the landing gear crankshaft 28. The connecting coupler 27 can then be placed over the landing gear crankshaft 28 and reversibly locked into place with the clip pin 37.

Figure 4:
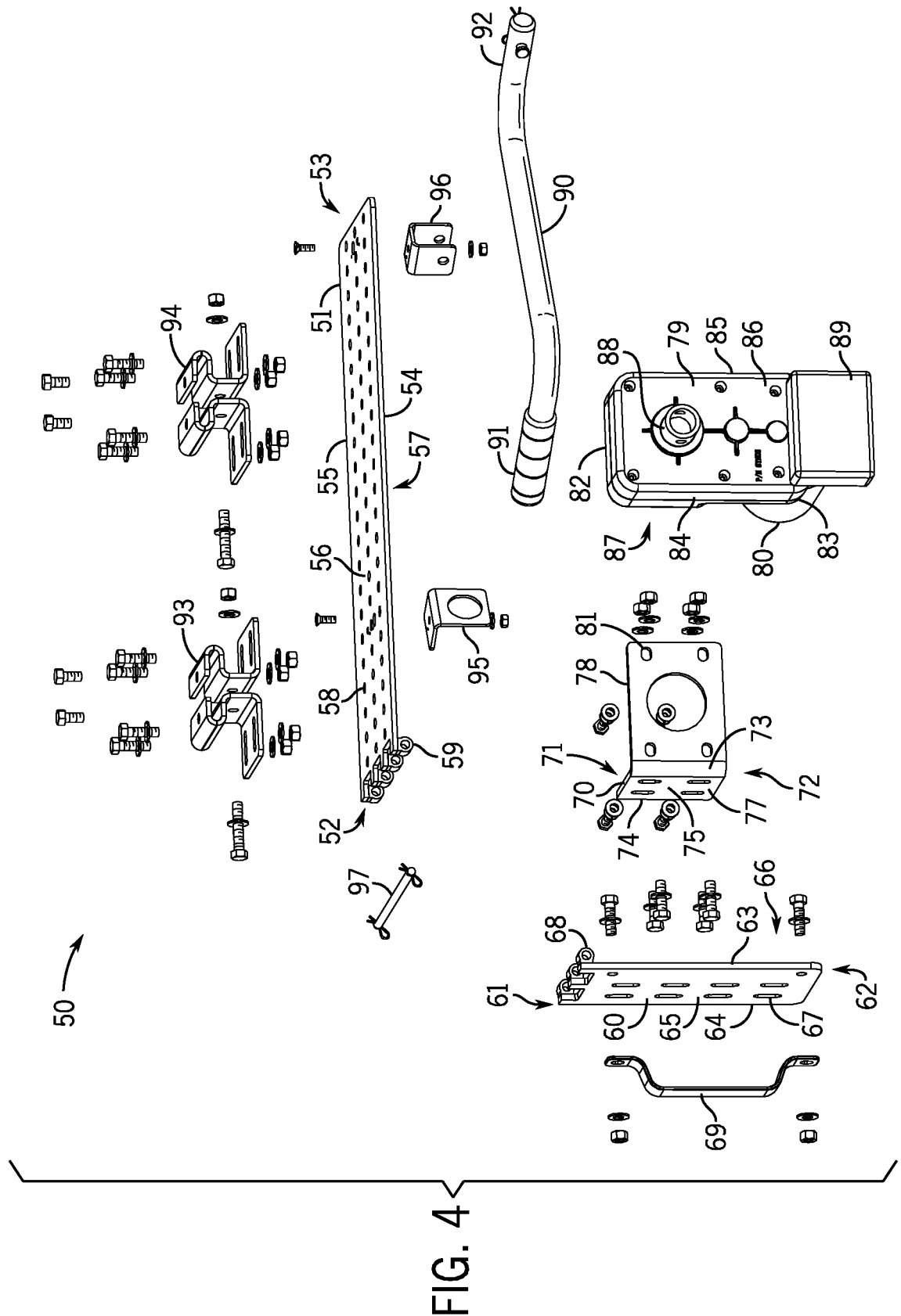
FIG. 4 shows an exploded front perspective view of an alternant embodiment of the adjustable motor mount for a semi-trailer landing gear.

FIG. 4 shows an exploded front perspective view of an alternant embodiment of the adjustable motor mount for a semi-trailer landing gear. The adjustable motor mount 50 has a first plate 51 with a first end 52, a second opposite end 53, a first side 54, a second opposite side 55, a top surface 56, and a bottom surface 57. The first plate has a plurality of holes 58. The first end 52 has hinge members 59. The adjustable motor mount 50 has a second plate 60 with a first end 61, a second opposite end 62, a first side 63, a second opposite side 64, a top surface 65, and a bottom surface 66. The second plate 60 has a plurality of slots 67. The first end 61 has hinge members 68. The second plate 60 also has a handle 69 mounted on the top surface 65. The adjustable motor mount 50 has a third plate 70 with a first end 71, a second opposite end 72, a first side 73, a second opposite side 74, a top surface 75, and a bottom surface 76 (see FIG. 7). The third plate has a plurality of slots 77. The third plate also has a mounting bracket 78 attached perpendicularly to its first side 73 for attachment of a gear box 79 and motor 80 using holes 81. The gearbox 79 has a first end 82, a second opposite end 83, a first side 84 (left side), a second opposite side 85 (right side), a front surface 86, and a rear surface 87 (see FIG. 7). The motor 80 is mounted near the second opposite end 83 of the gearbox 79. The gearbox 79 has a female connecting coupler 88 that extends from the front surface 86 to the rear surface 87 and a control panel 89 on its front surface 86. A hand crank 90 can be used to raise and lower jack legs of a semi-trailer if the motor 80 becomes inoperable. The hand crank 90 has a grip end 91 for grasping and a male coupler connecting end 92 for engaging the female coupler 88 on the front surface 86 of the gear box 79. I-beam mounts 93 and 94 are used to attach the first plate 51 to the frame of a semi-trailer. Holders 95 and 96 are used to hold the hand crank 90 under the first plate 51. A hinge rod 97 connects the hinge members 59 and 68 to form a hinge 98 (see FIG. 6).

Figure 5:
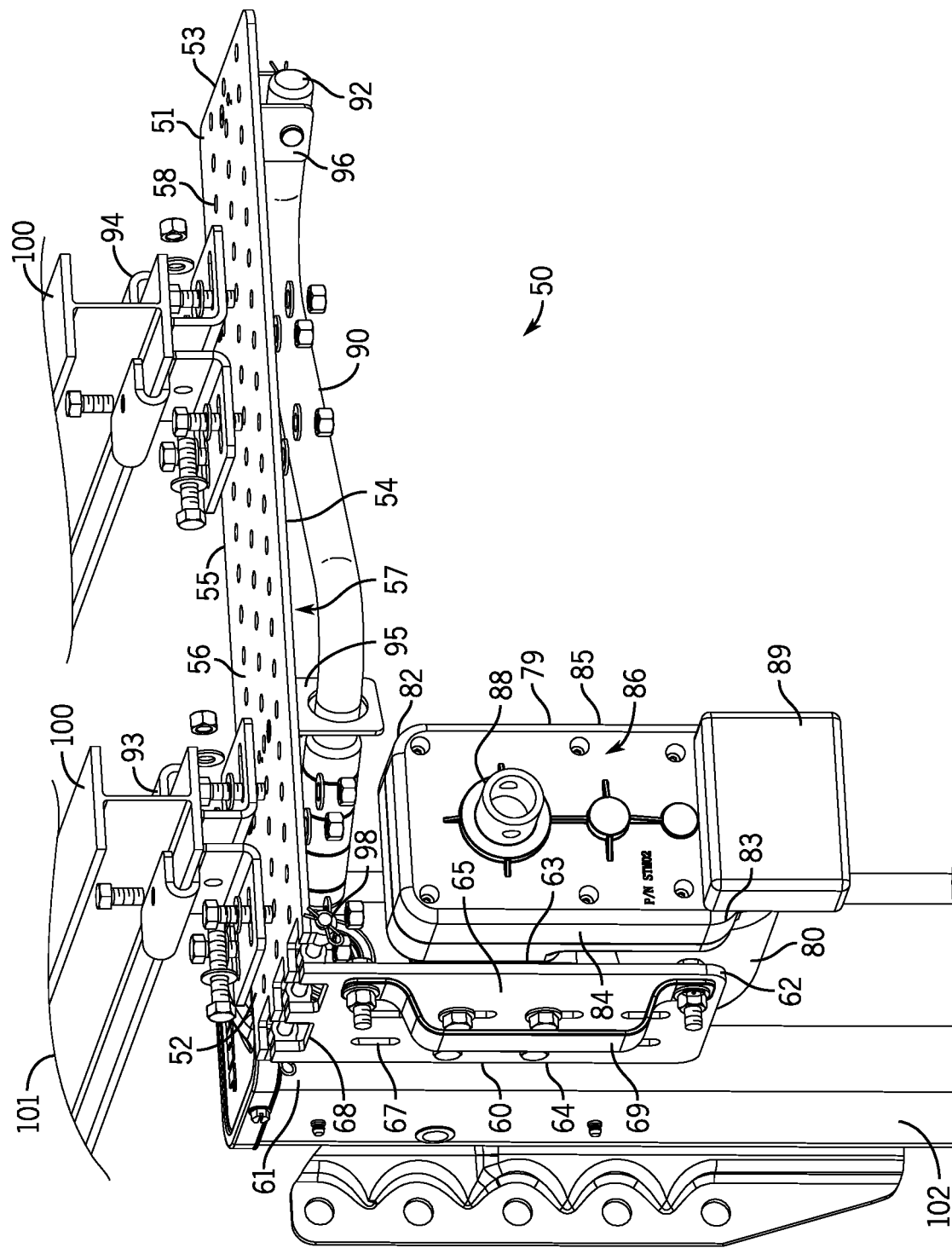
FIG. 5 shows a front perspective view of the motor mount of FIG. 4 in an assembled configuration.

FIG. 5 shows a front perspective view of the assembled motor mount 50. FIG. 5 further shows I-beams 100 attached to the underside of the frame of a semi-trailer 101 and a jack leg 102 having a landing gear crankshaft 104 for raising and lowering the semi-trailer 101 (see FIG. 9). The motor mount 50 is mounted slidably and reversibly to the I-beams 100 with I-beam mounts 93 and 94. The I-beam mounts 93 and 94 are mounted reversibly on the top surface 56 of the first plate 51 with bolts inserted through holes 58. The I-beam mounts 93 and 94 allow the motor mount 50 to be moved along the I-beams 100 towards or away from the landing gear crank shaft and then be reversibly fastened in place. The I-beam mounts 93 and 94 can be mounted in different holes 58 on the top surface 56 of the first plate 51 to move the motor mount to the right or to the left of the landing gear crank shaft and towards or away from the landing gear crank shaft. FIG. 5 also shows the gearbox 79 positioned adjacent to the jack leg 102 and the hand crank 90 attached to the bottom surface 57 of the first plate 51 with holders 95 and 96.

Figure 6:
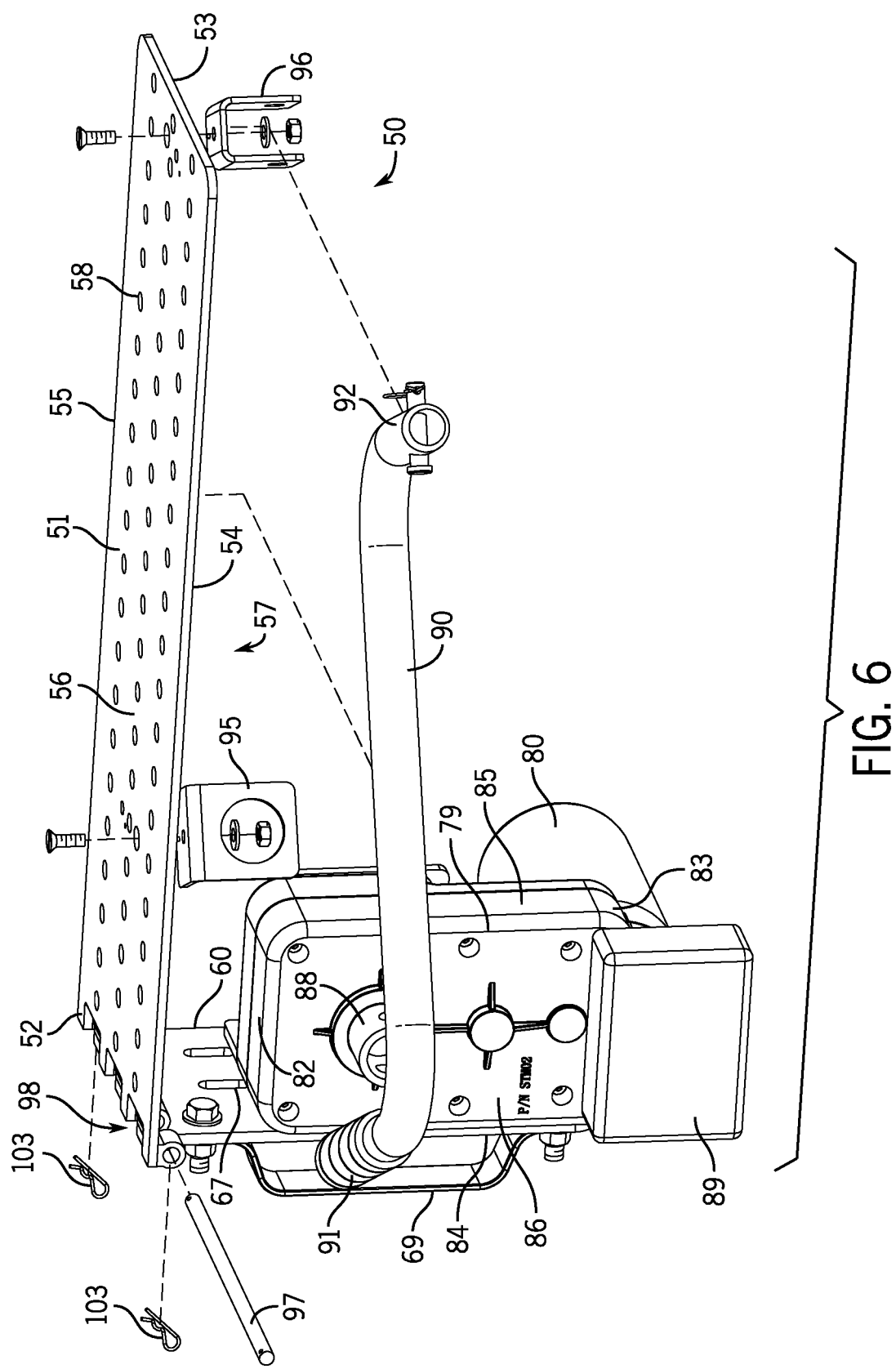
FIG. 6 shows a front, right side view of a gear box and motor.

FIG. 6 shows a front right side view of the gear box 79 and motor mount 50. FIG. 6 illustrates the formation of the hinge 98 between the first plate 51 and the second plate 60 using the hinge rod 97 and cotter pins 103. The second plate 60 is, thus, attached rotatably from its first end 61 and hinge members 68 to the first end 52 of the first plate 51 and hinge members 59 to form the hinge 98. Preferably, the hinge members 59 and 68 are spaced apart so that the second plate 60 is slidable on the hinge rod 97 towards the first side 54 of the first plate 51 and towards the second side 55 of the first plate 51. The hinge 98 is, preferably, a slidable hinge as described in FIG. 2. The hinge 98 allows the gear box 79 and motor 80 to be rotated upward and downward using handle 69 on the second plate 60. In addition, the hinge 98 may allow the second plate 60 to be moved towards the first side 54 or towards the second opposite side 55 of the first plate 51 which allows the gear box 79 and the motor 80 to be moved towards or away from the landing gear crank shaft 104.

Figure 7:
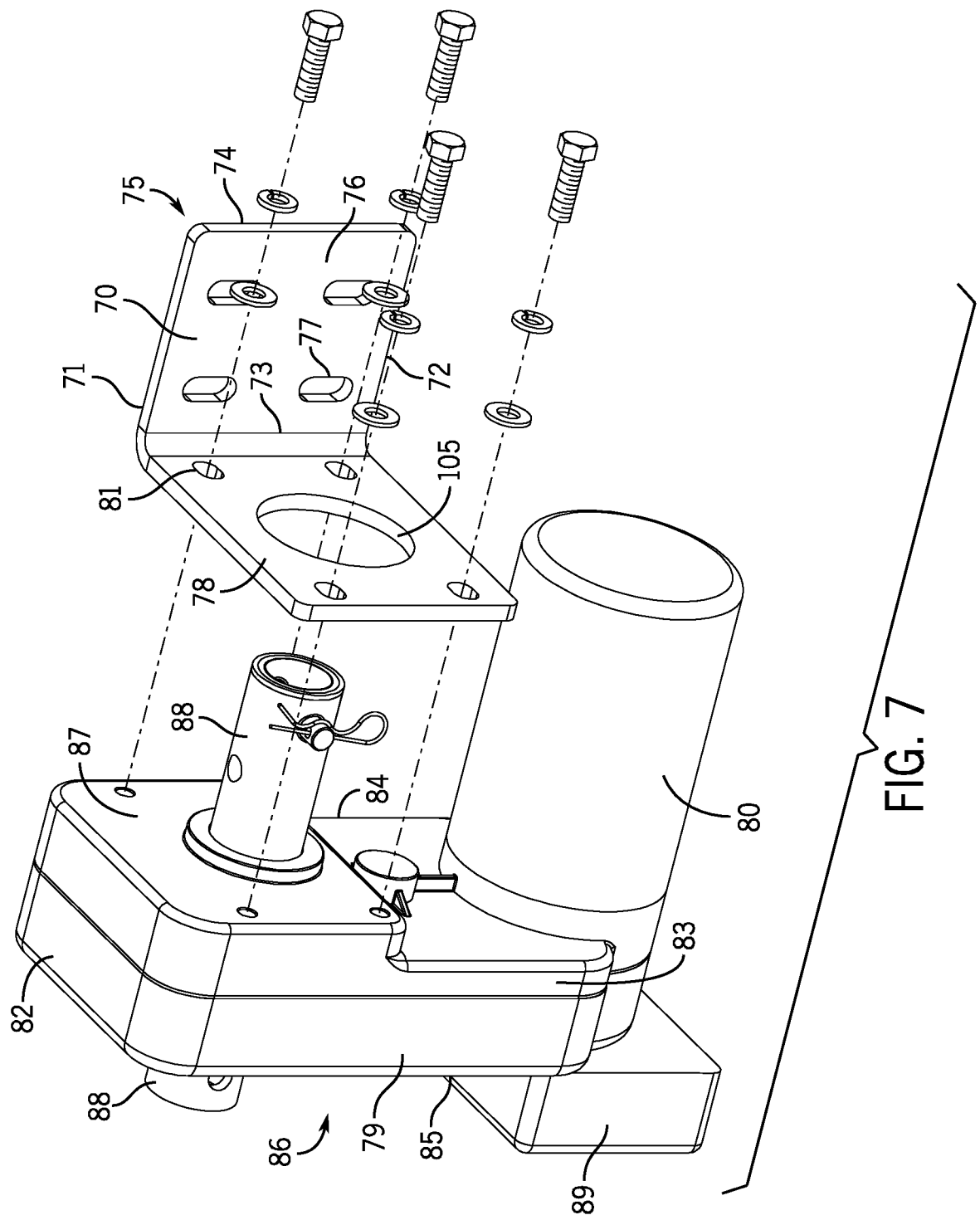
FIG. 7 shows a rear right side view of the gearbox and motor, showing attachment of the gearbox to a mounting bracket which is attached to a first side of a third plate.

FIG. 7 shows a rear right side view of the gearbox 79 and motor 80 and attachment of the gearbox 79 to the mounting bracket 78 attached to the first side 73 of the third plate 70. FIG. 7 shows the female coupler 88 extending from the rear surface 87 as well as the front surface 86 of the gearbox 79. The female coupler 88 at the front surface 86 connects to a male coupler 92 on the hand crank 90 and the female coupler 88 at the rear surface 87 connects to a male coupler on a landing gear crank shaft 104 in the jack leg 102 (see FIG. 9). The mounting bracket 78 has an opening 105 for the female coupler 88 to extend to the male coupler on the landing gear crankshaft 104 in the jack leg 102.

Figure 8:
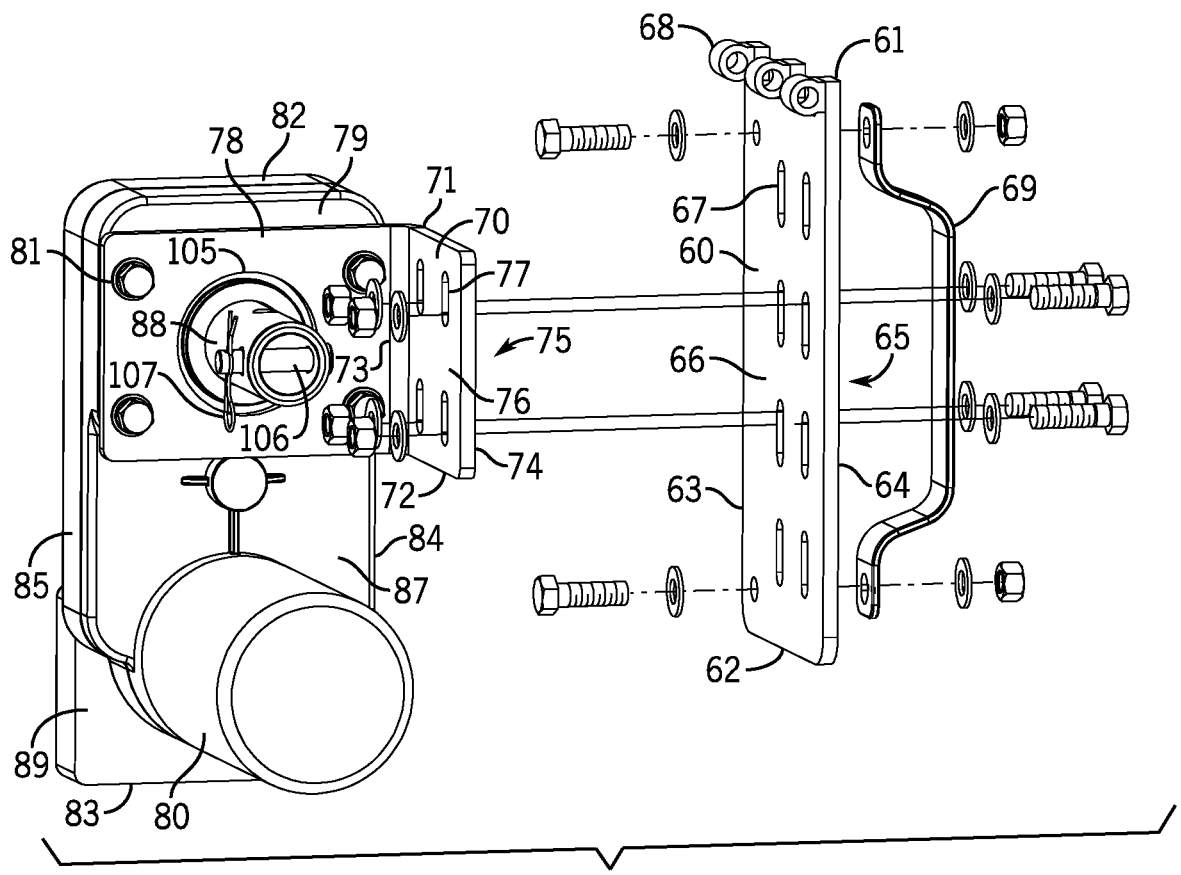
FIG. 8 shows a rear view of the gear box and motor and attachment of a top surface of a third plate to a bottom surface of a second plate.

FIG. 8 shows a rear view of the gear box 79 and motor 80 and attachment of the top surface 75 of the third plate 70 to the bottom surface 66 of the second plate 60 using bolts inserted through slots 77 on the third plate 70 and slots 67 on second plate 61. Thus, the third plate 70 can be mounted slidably in different slots 67 on the second plate 61 with different slots 77 on the third plate 70 so that the third plate 70 and gear box 79 and motor 80 can be moved up or down. A clevis 106 and cotter pin 107 are shown in the female coupler 88 for connecting the female coupler 88 on the rear surface 87 of the gear box 79 to the male coupler on a landing gear crankshaft 104 in the jack leg 102.

Figure 9:
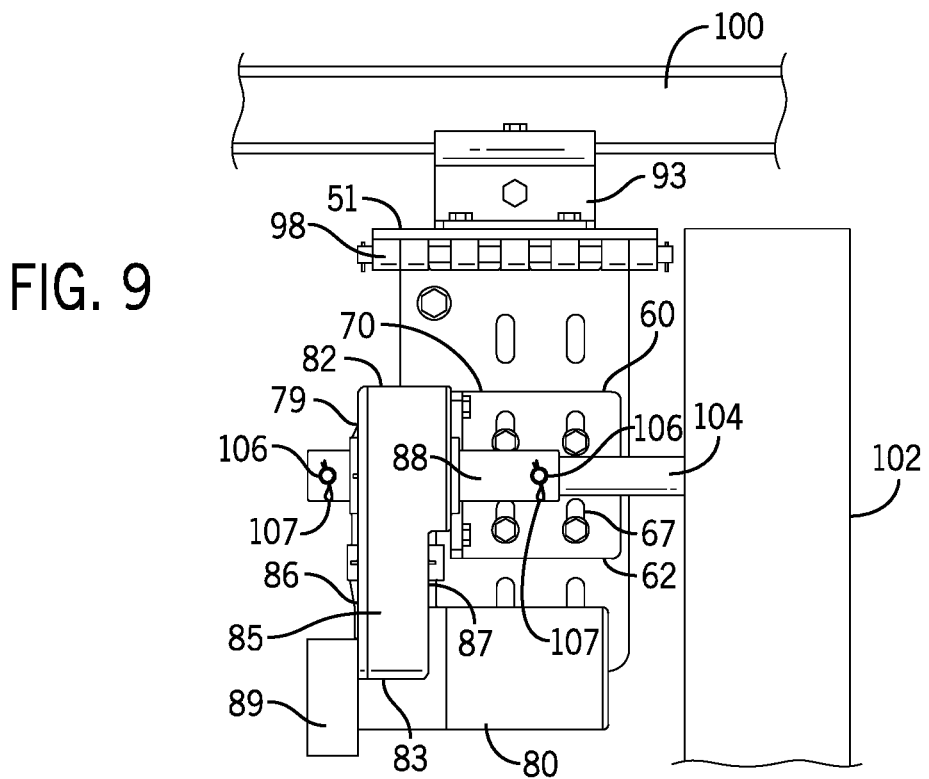
FIG. 9 shows a right side illustration view of the gear box and motor and a jack leg.

FIG. 9 shows a right side illustration view of the gear box 79, motor 80, and jack leg 102. The female coupler 88 at the rear surface 87 of the gear box 79 connects to a male coupler on a landing gear crankshaft 104 in the jack leg 102 with a clevis 106 and a cotter pin 107. If the motor 80 becomes inoperative the gear box 79 can be operated with the hand crank 90 by connecting the male coupler connecting end 92 of the hand crank 90 to the female coupler 88 on the front surface 86 of the gear box 79 and rotating the female coupler 88 with the hand crank 90. Semi-trailers have a pair of jack legs at a front end of the semi-trailer to raise and lower the front end. The jack legs are connected to each other with a drive shaft. Turning the landing gear crank shaft of one jack leg will turn the landing gear crank shaft in the other jackleg so that the jacklegs act in unison to raise the end of the semi-trailer. Thus, the adjustable motor mount 50 connected to a landing gear drive shaft in one jack leg will operate both jack legs to raise and lower the end of the semi-trailer.

Figure 10:
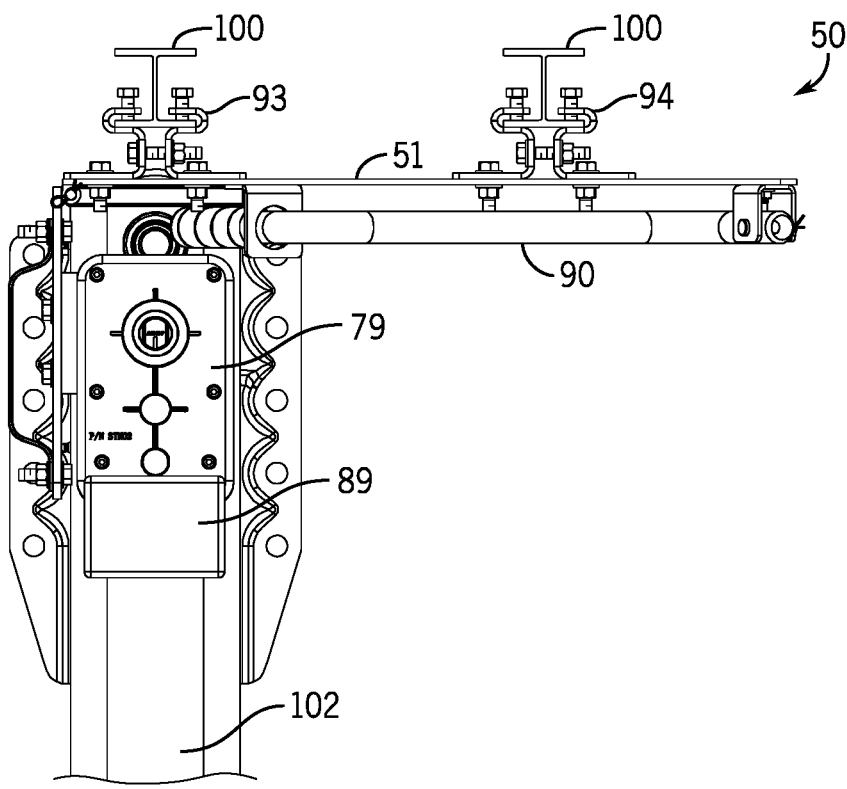
FIG. 10 is a front elevation view of the adjustable motor mount and gearbox and motor attached to I-beams when the jack leg is positioned under an I-beam.
Figure 11:
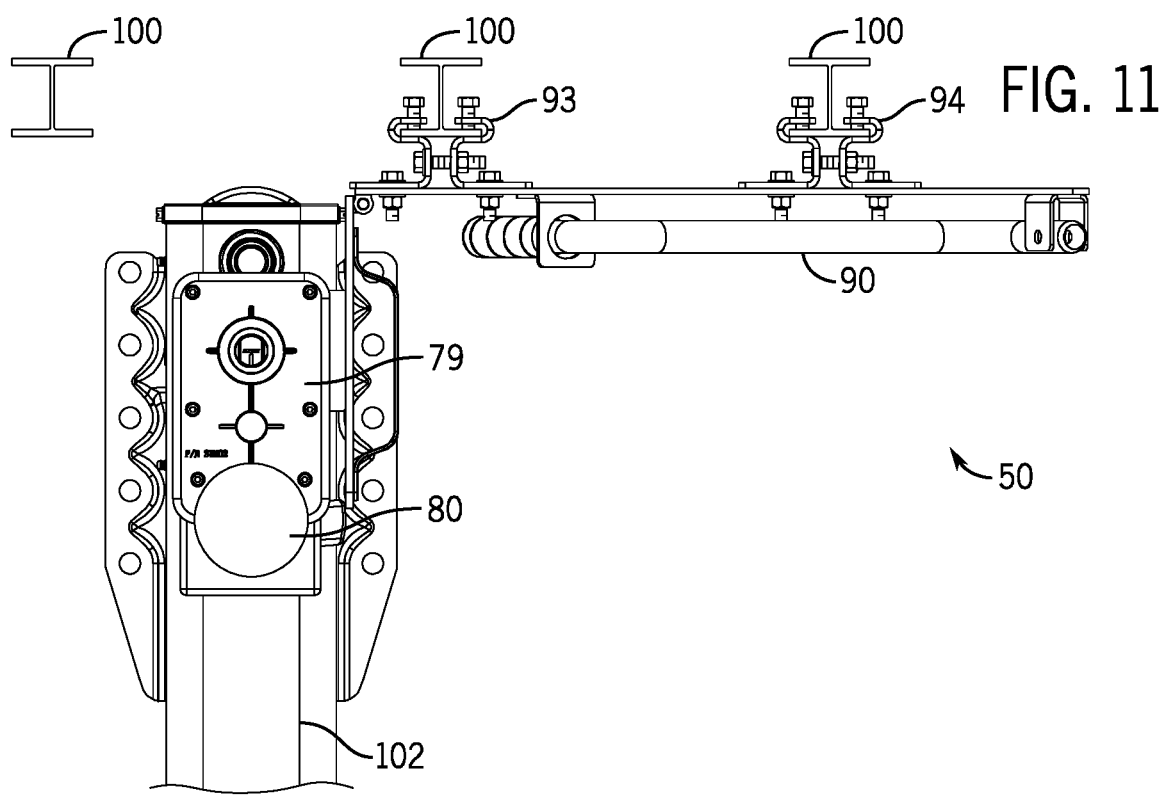
FIG. 11 is a front elevation view of the motor mount and gearbox and motor attached to I-beams when the jack leg is positioned between the I-beams.

FIG. 10 is a front elevation view of the motor mount 50, gearbox 79, and motor 80 attached to the I-beams 100 when the jack leg 102 is positioned under an I-beam 100. The female coupler 88 at the rear surface 87 of the gear box 79 connects to a male coupler on a landing gear crankshaft 104 in the jack leg 102, as shown in FIG. 9. FIG. 11 is a front elevation view of the motor mount 50, gearbox 79, and motor 80 attached to the I-beams 100 when the jack leg 102 is positioned between I-beams 100. In this configuration the second plate 60 is attached to the first plate 50 in a reverse direction so that the female coupler 88 at the front surface 86 of the gear box 79 connects to the male coupler on a landing gear crankshaft 104 in the jack leg 102, opposite to that shown in FIG. 9.

The plates can be made of any suitable metal, preferably steel. Any type of suitable motor can be used with the adjustable motor mount, preferably an electric motor. The motor can be powered and regulated to turn both clockwise and counter clockwise by methods well known in the art to raise and lower the landing gear. The motor can also be operated remotely by methods well known in the art.

The foregoing description illustrates and describes the disclosure. Additionally, the disclosure shows and describes only the preferred embodiments but, as mentioned above, it is to be understood that the preferred embodiments are capable of being formed in various other combinations, modifications, and environments and are capable of changes or modifications within the scope of the invention concepts as expressed herein, commensurate with the above teachings and/or the skill or knowledge of the relevant art. The embodiments described herein above are further intended to explain the best modes known by applicant and to enable others skilled in the art to utilize the disclosure in such, or other, embodiments and with the various modifications required by the particular applications or uses thereof. Accordingly, the description is not intended to limit the invention to the form disclosed herein. Also, it is intended that the appended claims be construed to include alternative embodiments. It will be further understood that various changes in the details, materials, and arrangements of the parts which have been described and illustrated above in order to explain the nature of this invention may be made by those skilled in the art without departing from the principle and scope of the invention as recited in the following claims.

We claim:

1. An adjustable motor mounting system, comprising:
   i) an adjustable motor mount, comprising:
      a) a first plate having a first end and a second end opposite the first end of said first plate, said first plate having a first side and a second side opposite the first side of said first plate, said first plate having a top surface and a bottom surface;
      b) a second plate having a first end and a second end opposite the first end of said second plate, said second plate having a first side and a second side opposite the first side of said second plate, said second plate having a top surface and a bottom surface;
      c) a third plate having a first side and a second side opposite the first side of said third plate, said third plate attached slidably to said second plate;
      d) a mounting plate attached to the first side of said third plate and oriented substantially perpendicularly to said third plate;
      e) a hinge connecting the first end of said second plate to the first end of said first plate so that said second plate is rotatable relative to said first plate; and
      f) I-beam mounts arranged on the top surface of said first plate and attached slidably to I-beams on a frame of a semi-trailer;
   ii) a gear box with a motor, said gear box attached directly to said mounting plate, said gear box having a female connecting coupler passing through an opening in said mounting plate, wherein the female connecting coupler is positioned adjacent a bottom surface of said third plate, wherein the female connecting coupler is connected to a landing gear crankshaft of the semi-trailer, and wherein the landing gear crankshaft is substantially parallel to an axis of rotation of said hinge.

2. The adjustable motor mounting system of claim 1, wherein said gear box is movable towards or away from the landing gear crankshaft by moving said I-beam mounts along the I-beams towards or away from the landing gear crankshaft.

3. The adjustable motor mounting system of claim 1, wherein said gear box is movable leftward or rightward of the landing gear crankshaft by moving said I-beam mounts towards the first end of said first plate or the second end of said first plate and wherein said gear box is movable towards or away from the landing gear crankshaft by moving said I-beam mounts towards the first side of said first plate or the second side of said first plate.

4. The adjustable motor mounting system of claim 1, wherein said gear box is rotatable upward about said hinge or downward about said hinge so that the female connecting coupler is movable relative to the landing gear crankshaft.

5. The adjustable motor mounting system of claim 1, wherein said gear box is movable upward towards the first end of said second plate or downward towards the second end of said second plate.

6. The adjustable motor mounting system of claim 1, wherein said gear box has a first end, a second end, a first side, a second side, a front surface, and a rear surface, wherein the second end of said gear box is opposite the first end of said gear box, wherein the second side of said gear box is opposite the first side of said gear box, and wherein the female connecting coupler extends from the front surface of said gear box to the rear surface of said gear box.

7. The adjustable motor mounting system of claim 1, wherein said hinge comprises spaced hinge members on said first plate and on said second plate with a hinge rod extending therethrough so that said second plate is slidable on the hinge rod towards the first side of said first plate or towards the second side of said first plate.

8. An adjustable motor mounting system, comprising:
i) an adjustable motor mount, comprising:
   a) a first plate having a first end and a second end opposite the first end of said first plate, said first plate having a first side and a second side opposite the first side of said first plate, said first plate having a top surface and a bottom surface;
   b) a second plate having a first end and a second end opposite the first end of said second plate, said second plate having a first side and a second side opposite the first side of said second plate, said second plate having a top surface and a bottom surface;
   c) a third plate having a first side and a second side opposite the first side of said third plate, said third plate attached slidably to said second plate;
   d) a mounting plate attached to the first side of said third plate and oriented substantially perpendicularly to said third plate;
   e) a hinge connecting the first end of said second plate to the first end of said first plate so that said second plate is rotatable relative to said first plate; and
   f) I-beam mounts arranged on the top surface of said first plate and attached slidably to I-beams on a frame of a semi-trailer;
ii) a gear box with a motor, said gear box attached directly to said mounting plate, said gear box having a female connecting coupler passing through an opening in said mounting plate, wherein the female connecting coupler is positioned adjacent a bottom surface of said third plate, wherein the female connecting coupler is connected to a landing gear crankshaft of the semi-trailer, wherein the landing gear crankshaft is substantially parallel to an axis of rotation of said hinge, wherein said gear box is movable towards or away from the landing gear crankshaft by moving said I-beam mounts along the I-beams towards or away from the landing gear crankshaft, wherein said gear box is movable leftward or rightward of the landing gear crankshaft by moving said I-beam mounts towards the first end of said first plate or the second end of said first plate and wherein said gear box is movable towards or away from the landing gear crankshaft by moving said I-beam mounts towards the first side of said first plate or the second side of said first plate.

9. The adjustable motor mounting system of claim 8, wherein said gear box is rotatable upward about said hinge or downward about said hinge so that the female connecting coupler is movable relative to the landing gear crankshaft.

10. The adjustable motor mounting system of claim 8, wherein said gear box is movable upward towards the first end of said second plate or downward towards the second end of said second plate.

11. The adjustable motor mounting system of claim 8, wherein said gear box has a first end, a second end, a first side, a second side, a front surface, and a rear surface, wherein the second end of said gear box is opposite the first end of said gear box, wherein the second side of said gear box is opposite the first side of said gear box, and wherein the female connecting coupler extends from the front surface of said gear box to the rear surface of said gear box.

12. The adjustable motor mounting system of claim 8, wherein said hinge comprises spaced hinge members on said first plate and on said second plate with a hinge rod extending therethrough so that said second plate is slidable on the hinge rod towards the first side of said first plate or towards the second side of said first plate.

13. An adjustable motor mounting system, comprising:
i) an adjustable motor mount, comprising:
   a) a first plate having a first end and a second end opposite the first end of said first plate, said first plate having a first side and a second side opposite the first side of said first plate, said first plate having a top surface and a bottom surface;
   b) a second plate having a first end and a second end opposite the first end of said second plate, said second plate having a first side and a second side opposite the first side of said second plate, said second plate having a top surface and a bottom surface;
   c) a third plate having a first side and a second side opposite the first side of said third plate, said third plate attached slidably to said second plate;
   d) a mounting plate attached to the first side of said third plate and oriented substantially perpendicularly to said third plate;
   e) a hinge connecting the first end of said second plate to the first end of said first plate so that said second plate is rotatable relative to said first plate; and
   f) I-beam mounts arranged on the top surface of said first plate and attached slidably to I-beams on a frame of a semi-trailer;

ii) a gear box with a motor, said gear box attached directly to said mounting plate, said gear box having a female connecting coupler passing through an opening in said mounting plate, wherein the female connecting coupler is positioned adjacent a bottom surface of said third plate, wherein the female connecting coupler is connected to a landing gear crankshaft of the semi-trailer, wherein the landing gear crankshaft is substantially parallel to an axis of rotation of said hinge, wherein said gear box is movable towards or away from the landing gear crankshaft by moving said I-beam mounts along the I-beams towards or away from the landing gear crankshaft, wherein said gear box is movable leftward or rightward of the landing gear crankshaft by moving said I-beam mounts towards the first end of said first plate or the second end of said first plate, wherein said gear box is movable towards or away from the landing gear crankshaft by moving said I-beam mounts towards the first side of said first plate or the second side of said first plate, wherein said gear box is rotatable upward about said hinge or downward about said hinge so that the female connecting coupler is movable relative to the landing gear crankshaft, and wherein said gear box is movable upward towards the first end of said second plate or downward towards the second end of said second plate.

14. The adjustable motor mounting system of claim 13, wherein said gear box has a first end, a second end, a first side, a second side, a front surface, and a rear surface, wherein the second end of said gear box is opposite the first end of said gear box, wherein the second side of said gear box is opposite the first side of said gear box, and wherein the female connecting coupler extends from the front surface of said gear box to the rear surface of said gear box.

15. The adjustable motor mounting system of claim 13, wherein said hinge comprises spaced hinge members on said first plate and on said second plate with a hinge rod extending therethrough so that said second plate is slidable on the hinge rod towards the first side of said first plate or towards the second side of said first plate.

16. An adjustable motor mounting system, comprising:
  i) an adjustable motor mount, comprising:
    a) a first plate having a first end and a second end opposite the first end of said first plate, said first plate having a first side and a second side opposite the first side of said first plate, said first plate having a top surface and a bottom surface;
    b) a second plate having a first end and a second end opposite the first end of said first plate, said second plate having a first side and a second side opposite the first side of said second plate, said second plate having a top surface and a bottom surface;
    c) a third plate having a first side and a second side opposite the first side of said third plate, said third plate attached slidably to said second plate;
    d) a mounting plate attached to the first side of said third plate and oriented substantially perpendicularly to said third plate;
    e) a hinge connecting the first end of said second plate to the first end of said first plate so that said second plate is rotatable relative to said first plate, said hinge having spaced hinge members on said first plate and on said second plate with a hinge rod extending therethrough so that said second plate is slidable on the hinge rod towards the first side of said first plate or towards the second side of said first plate; and
    f) I-beam mounts arranged on the top surface of said first plate and attached slidably to I-beams on a frame of a semi-trailer;
  ii) a) a gear box with a motor, said gear box attached directly to said mounting plate, said gear box having a female connecting coupler passing through an opening in said mounting plate, wherein the female connecting coupler is positioned adjacent a bottom surface of the third plate, wherein the female connecting coupler is connected to a landing gear crankshaft of the semi-trailer, wherein the landing gear crankshaft is substantially parallel to an axis of rotation of said hinge, wherein said gear box is movable towards or away from the landing gear crankshaft by moving said I-beam mounts along the I-beams towards or away from the landing gear crankshaft, wherein said gear box is movable leftward or rightward of the landing gear crankshaft by moving said I-beam mounts towards the first end of said first plate or the second end of said first plate, wherein said gear box is movable towards or away from the landing gear crankshaft by moving said I-beam mounts towards the first side of said first plate or the second side of said first plate, wherein said gear box is rotatable upward about said hinge or downward about said hinge so that the female connecting coupler is movable relative to the landing gear crankshaft, and wherein said gear box is movable upward towards the first end of said second plate or downward towards the second end of said second plate; and
    b) said gear box having a first end, a second end, a first side, a second side, a front surface, and a rear surface, wherein the second end of said gear box is opposite the first end of said gear box, wherein the second side of said gear box is opposite the first side of said gear box, and wherein the female connecting coupler extends from the front surface of said gear box to the rear surface of said gear box.

\* \* \* \* \*